United States Patent
Dumais et al.

(10) Patent No.: US 7,089,226 B1
(45) Date of Patent: Aug. 8, 2006

(54) SYSTEM, REPRESENTATION, AND METHOD PROVIDING MULTILEVEL INFORMATION RETRIEVAL WITH CLARIFICATION DIALOG

(75) Inventors: Susan T. Dumais, Kirkland, WA (US); Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 280 days.

(21) Appl. No.: 09/893,827

(22) Filed: Jun. 28, 2001

(51) Int. Cl.
*G06F 17/30* (2006.01)

(52) U.S. Cl. .......................... 707/3; 707/101; 707/102; 707/103 Y; 707/104.1

(58) Field of Classification Search .................... 707/5, 707/4, 3, 1, 101, 102, 103 Y, 104.1; 715/705; 379/88.01
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,694,559 A * | 12/1997 | Hobson et al. | 715/705 |
| 5,812,865 A | 9/1998 | Theimer et al. | |
| 5,835,087 A * | 11/1998 | Herz et al. | 345/810 |
| 5,974,412 A * | 10/1999 | Hazlehurst et al. | 707/3 |
| 6,006,221 A * | 12/1999 | Liddy et al. | 707/5 |
| 6,021,403 A * | 2/2000 | Horvitz et al. | 706/45 |
| 6,088,692 A * | 7/2000 | Driscoll | 707/5 |
| 6,289,353 B1* | 9/2001 | Hazlehurst et al. | 707/102 |
| 6,405,188 B1* | 6/2002 | Schwartz et al. | 707/3 |
| 6,457,004 B1* | 9/2002 | Nishioka et al. | 707/5 |
| 6,466,232 B1 | 10/2002 | Newell et al. | |
| 6,513,036 B1* | 1/2003 | Fruensgaard et al. | 707/4 |
| 6,513,046 B1 | 1/2003 | Abbott, III et al. | |
| 6,549,915 B1 | 4/2003 | Abbott, III et al. | |
| 6,567,805 B1* | 5/2003 | Johnson et al. | 707/5 |
| 6,747,675 B1 | 6/2004 | Abbott et al. | |
| 6,791,580 B1 | 9/2004 | Abbott et al. | |

(Continued)

FOREIGN PATENT DOCUMENTS

WO     9800787     1/1998

OTHER PUBLICATIONS

Dumais et al. "Hierarchical Classification of Web Content." Procs. of the 23rd Annual ACM SIGIR Conference on Research and Development in Information Retrieval. pp. 256-263. Jul. 2000. ACM Press.*

(Continued)

*Primary Examiner*—Thuy N. Pardo
(74) *Attorney, Agent, or Firm*—Amin & Turocy, LLP

(57) ABSTRACT

An information retrieval system, including a learning and real-time classification methodology, is provided in accordance with the present invention. The system includes a hierarchal analysis component that receives a query and processes probabilities associated with N categories, each category having one or more topics, wherein N is an integer. An interactive component drives clarification dialog that is derived from the query and the probabilities associated with the N categories and the one or more topics. The clarification dialog, driven by a rule-based policy, a decision-theoretic analysis considering the costs of dialog to focus the results versus the costs of browsing larger lists, or combinations of rules and decision-theoretic analysis is employed when valuable to determine at least one category of the N categories to facilitate retrieval of at least one of the topics.

38 Claims, 9 Drawing Sheets

U.S. PATENT DOCUMENTS

| | | | |
|---|---|---|---|
| 6,801,223 B1 | 10/2004 | Abbott et al. | |
| 6,812,937 B1 | 11/2004 | Abbott et al. | |
| 6,842,877 B1 | 1/2005 | Robarts et al. | |
| 6,895,083 B1* | 5/2005 | Bers et al. | 379/88.01 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0091686 A1* | 7/2002 | Olan, Jr. | 707/5 |
| 2002/0099817 A1 | 7/2002 | Abbott et al. | |
| 2002/0138478 A1* | 9/2002 | Schwartz et al. | 707/3 |
| 2003/0046401 A1 | 3/2003 | Abbott et al. | |
| 2003/0154476 A1 | 8/2003 | Abbott, III et al. | |
| 2005/0034078 A1 | 2/2005 | Abbott et al. | |

OTHER PUBLICATIONS

Chen et al. "Bringing Order to the Web: Automatically Categorizing Search Results." Procs. of the SIGCHI Conference on Human Factors in Computing Systems. pp. 145-152. Apr. 2000. ACM Press.*
USPTO, "Interim Guidelines for Examination of Patent Applications for Subject Matter Eligibility" 1300 OG 142, Nov. 22, 2005, pp. 50-57. (Also available on the web at: http://www.uspto.gov/web/offices/pac/dapp/ogsheet.html).*
Ono, A., et al.; "A Flexible Content-Based Image Retrieval System with Combined Scene Description Keyword", *Proceedings of the International Conference on Multimedia Computing and Systems,* 1996, p. 201-208.
Hiemstra, D.; "A Probabilistic Justification for Using tf*idf Term Weighting in Information Retrieval", *International Journal on Digital Libraries,* vol. 3, No. 2, p. 131-139.
Mahajan, M., et al.; "Improved Topic-Dependent Language Modeling Using Information Retrieval Techniques", *1999 IEEE International Conference on Acoustics, Speech, and Signal Processing. Proceedings. ICASSP99,* vol. 1, 1999, p. 541-544.
Motomura, Y., et al.; "Generative User Models for Adaptive Information Retrieval", *SMC 2000 Conference Proceeding. 2000 IEEE International Conference on Systems, Man and Cybernetics. 'Cybernetics Evolving to Systems, Humans, Organizations, and their Complex Interactions',* vol. 1, 2000, p. 665-670.
Carpineto, C., et al.; "An Information-Theoretic Approach to Automatic Query Expansion", *ACM Transactions on Information Systems,* vol. 19, No. 1, Jan. 2001, p. 1-27.
Andy Harter, et al., A Distributed Location System for the Active Office, IEEE Network, 1994, pp. 62-70.
Guanling Chen, et al., A Survey of Context-Aware Mobile Computing Research, Dartmouth Computer Science Technical Report, 2000, 16 pages.
William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.
Marvin Theimer, et al., Operating System Issues for PDAs, In Fourth Workshop on Workstation Operating Systems, 1993, 7 pages.
Roy Want, Active Badges and Personal Interactive Computing Objects, IEEE Transactions on Consumer Electronics, 1992, 11 pages, vol. 38-No. 1.
Bill N. Schilit, et al., The ParcTab Mobile Computing System, IEEE WWOS-IV, 1993, 4 pages.
Bill Schilit, et al., Context-Aware Computing Applications, In Proceedings of the Workshop on Mobile Computing Systems and Applications, Dec. 1994. pp. 85-90.
Bill N. Schilit, et al., Customizing Mobile Applications, Proceedings USENIX Symposium on Mobile and Location Independent Computing, Aug. 1993, 9 pages.
Mike Spreitzer, et al., Architectural Considerations for Scalable, Secure, Mobile Computing with Location Information, In The 14th International Conference on Distributed Computing Systems, Jun. 1994. pp. 29-38.
Mike Spreitzer et al., Scalable, Secure, Mobile Computing with Location Information, Communications of the ACM, Jul. 1993, 1 page, vol. 36-No. 7.
Roy Want, et al., The Active Badge Location System, ACM Transactions on Information Systems, Jan. 1992, pp. 91-102, vol. 10-No. 1.
Mark Weiser, Some Computer Science Issues in Ubiquitous Computing, Communications of the ACM, Jul. 1993, pp. 75-84, vol. 36-No. 7.
M. Billinghurst, et al., An Evaluation of Wearable Information Spaces, Proceedings of the Virtual Reality Annual International Symposium, 1998, 8 pages.
Bradley J. Rhodes, Remembrance Agent: A continuously running automated information retrieval system, The Proceedings of The First International Conference on The Practical Application Of Intelligent Agents and Multi Agent Technology, 1996, pp. 487-495.
Eric Horvitz, et al., In Pursuit of Effective Handsfree Decision Support: Coupling Bayesian Inference, Speech Understanding, and User Models, 1995, 8 pages.
Bradley J. Rhodes, The Wearable Remembrance Agent: A System for Augmented Theory, The Proceedings of The First International Symposium on Wearable Computers, Oct. 1997, pp. 123-128.
Eric Horvitz, et al., Attention-Sensitive Alerting in Computing Systems, Microsoft Research, Aug. 1999.
Bill N. Schilit, et al., Disseminationg Active Map Information to Mobile Hosts, IEEE Network, 1994, pp. 22-32, vol. 8-No. 5.
Mark Billinghurst, et al., Wearable Devices: New Ways to Manage Information, IEEE Computer Society, Jan. 1999, pp. 57-64.
Thad Eugene Starner, Wearable Computing and Contextual Awareness, Massachusetts Institute of Technology. Jun. 1999, 248 pages.
Bradley J. Rhodes, The Wearable Remembrance Agent: A System for Augmented Memory, Personal Technologies Journal Special Issue on Wearable Computing, 1997, 12 pages.
Workshop on Wearable Computing Systems, Aug. 19-21, 1996.
Mark Billinghurst, Research Directions in Wearable Computing, University of Washington, May 1998, 48 pages.

Mark Weiser, The Computer for the 21st Century, Scientific American, Sep. 1991, pp. 94-104, vol. 265-No. 3.

Apte, C., Damerau, F. and Weiss, S. "Automated Learning of Decision Rules for Text Categorization." ACM Transactions on Information Systems, 12(3), 233-251, 1994.

Chakrabarti, S., Dom, B., Agrawal, R. and Raghavan, P. "Scalable Feature Selection, Classification and Signature Generation for Organizing Large Text Databases into Hierarchical Topic Taxonomies." The VLDB Journal 7, 163-178, 1998.

Cohen, W.W. and Singer, Y. "Context-Sensitive Learning Methods for Text Categorization." Proceedings of the 19th Annual International ACM SIGIR Conference on Research and Development in Information Retrieval (SIGIR'96), 307-315, 1996.

D'Alessio, S., Murray, M., Schiaffino, R. and Kershenbaum, A. "Category Levels in Hierarchical Text Categorization." Proceedings of EMNLP-3, 3rd Conference on Empirical Methods in Natural Language Processing, 1998.

Dumais, S. T., Platt, J., Heckerman, D. and Sahami, M. "Inductive Learning Algorithms and Representations for Text Categorization." Proceedings of the Seventh International Conference on Information and Knowledge Management (CIKM'98), 148-155, 1998.

Fuhr, N., Hartmanna, S., Lustig, G., Schwantner, M., and Tzeras, K. "Air/X—A Rule-Based Multi-Stage Indexing System for Large Subject Fields." Proceedings of RIAO'91, 606-623, 1991.

Hearst, M., and Karadi, C. "Searching and Browsing Text Collections with Large Category Hierarchies." Proceedings of the ACM SIGCHI Conference on Human Factors in Computing Systems (CHI'97), Conference Companion, 1997.

Hearst, M. and Pedersen, J. "Reexamining the Cluster Hypothesis: Scatter/Gather on Retrieval Results." Proceedings of 19th Annual International ACM/SIGIR Conference on Research and Development in Information Retrieval (SIGIR'96), 1996.

Joachims, T. "Text Categorization with Support Vector Machines: Learning with Many Relevant Features." Proceedings of European Conference on Machine Learning (ECML'98), 1998.

Koller, D. and Sahami, M. 1997. "Hierarchically Classifying Documents Using Very Few Words." Proceedings of the Fourteenth International Conference on Machine Learning (ICML'97), 170-178, 1997.

Landauer, T., Egan, D., Remde, J., Lesk, M., Lochbaum, C., and Ketchum, D. "Enhancing the Usability of Text Through Computer Delivery and Formative Evaluation: The SuperBook Project." Hypertext—A Psychological Perspective. Ellis Horwood, 1993.

Larkey, L. "Some issues in the Automatic Classification of U.S. Patents." In Working Notes for the AAAI-98 Workshop on Learning for Text Categorization, 1998.

Lewis, D.D. and Ringuette, M. "A Comparison of Two Learning Algorithms for Text Categorization." Third Annual Symposium on Document Analysis and Information Retrieval (SDAIR'94), 81-93, 1994.

McCallum, A., Rosenfeld, R., Mitchell, T. and NG, A. "Improving Text Classification by Shrinkage in a Hierarchy of Classes." Proceedings of the Fifteenth International Conference on Machine Learning, (ICML-98), 359-367, 1998.

Mladenic, D. and Grobelnik, M. "Feature Selection for Classification Based on Text Hierarchy." Proceedings of the Workshop on Learning from Text and the Web, 1998.

Ng, H.T., Goh, W.B. and Low, K.L. "Feature Selection, Perception Learning, and a Usability Case Study for Text Categorization" Proceedings of 20th Annual International ACM SIGIR Conference on Research and Development in Information Retrieval (SIGIR'97), 67-73, 1997.

Platt, J. "Fast Training of Support Vector Machines Using Sequential Minimal Optimization." In Advances in Kernel Methods—Support Vector Learning. B. Schölkopf, C. Burges, and A. Smola, eds., MIT Press, 1999.

Ruiz, M.E. and Srinivasan, P. "Hierarchical Neural Networks for Text Categorization." Proceedings of the 22nd International ACM SIGIR Conference on Research and Development in Information Retrieval (SIGIR'99), 281-282, 1999.

Schütze, H., Hull, D. and Pedersen, J.O. "A Comparison of Classifiers and Document Representations for the Routing Problem." Proceedings of the 18th Annual International ACM SIGIR Conference on Research and Development in Information Retrieval (SIGIR'95), 229-237, 1995.

Weigend, A.S., Wiener, E.D. and Pedersen, J.O. "Exploiting Hierarchy in Text Categorization." Information Retrieval, I(3), 193-216, 1999.

Yang, Y. "Expert network: Effective and Efficient Learning from Human Decisions in Text Categorization and Retrieval." Proceedings of the 17th Annual International ACM SIGIR Conference on Research and Development in Information Retrieval (SIGIR'94), 13-22, 1994.

Yang, Y. and Lui, X. "A Re-examination of Text Categorization Methods." Proceedings of the 22nd Annual International ACM SIGIR Conference on Research and Development in Information Retrieval (SIGIR'99), 42-49, 1999.

Yang, Y. and Pedersen, J.O. "A Comparative Study on Feature Selection in Text Categorization." Proceedings of the Fourteenth International Conference on Machine Learning (ICML'97), 412-420, 1997.

Zamir, O. and Etzioni, O. "Web Document Clustering: A Feasibility Demonstration." Proceedings of the 21stst Annual International ACM SIGIR Conference on Research and Development in Information Retrieval (SIGIR'98), 46-54, 1998.

Allen, R. B., "Two Digital Library Interfaces that Exploit Hierarchical Structure." In Proceedings of DAGS95: Electronic Publishing and the Information Superhighway (1995).

Chekuri, C., Goldwasser, M., Raghavan, P. and Upfal, E. "Web Search Using Automatic Classification." In Sixth International World Wide Web Conference, Santa Clara, California, Apr. 1997.

Chen, M., Hearst, M., Hong, J., and Lin, J. "Cha-Cha: A System for Organizing Intranet Search Results." In Proceedings of the 2nd USENIX Symposium on Internet Technologies and SYSTEMS (USITS), Boulder Co, Oct. 1999.

Hearst, M., Pedersen, J., and Karger, D. "Scatter/Gather as a Tool for the Analysis of Retrieval Results." Working Notes of the AAAI Fall Symposium on Al Applications in Knowledge Navigation, Cambridge MA, Nov. 1995.

Johnson, B., and Shneiderman, B. Treemaps: A Spacefilling Approach to the Visualization of Hierarchical Information Structures. In Sparks of Innovation in Human-Computer Interaction. Ablex Publishing Corporation, Norwood NJ, 1993.

Maarek, Y., Jacovi, M., Shtalhaim, M., Ur, S., Zernik, D., and Ben Shaul, I.Z. "WebCutter: A System for Dynamic and Tailorable Site Mapping." In Proceedings of the 6th International World Wide Web Conference, Santa-Clara CA, Apr. 1997.

Marchionini, G., Plaisant, C., and Komlodi, A. "Interfaces and Tools for the Library of Congress National Digital Library Program." Information Processing and Management, 34, 535-555, 1998.

Mladenic, D. "Turning Yahoo Into an Automatic Web Page Classifier." In Proceedings of the 13th European Conference on Artificial Intelligence (ECAI'98) 473-474.

Pratt, W. "Dynamic Organization of Search Results Using the UMLs." In American Medical Informatics Association Fall Symposium, 1997.

Pratt, W., Hearst, M. and Fagan, L. "A Knowledge-Based Approach to Organizing Retrieved Documents." In Proceedings of AAAI-99, 1999.

B. Shneiderman, D . Feldman, A. Roseand and X.F. Grau, "Visualizing Digital Library Search Results with Categorical and Hierarchical Axes." Proceedings of the 5th International Conference on Digital Libraries (DL'00), pp. 57-65, ACM Press, New York, NY, 2000.

Wittenburg, K. and Sigman, E. "Integration of Browsing, Searching and Filtering in an Applet for Information Access." In Proceedings of ACM CH197: Human Factors in Computing Systems, Atlanta GA, Mar. 1997.

Zamir, O., and Etzioni, O. "Grouper: A Dynamic Clustering Interface to Web Search Results." In Proceedings of WWW8, Toronto, Canada, May 1999.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

* cited by examiner

SYSTEM, REPRESENTATION, AND METHOD PROVIDING MULTILEVEL INFORMATION RETRIEVAL WITH CLARIFICATION DIALOG

TECHNICAL FIELD

The present invention relates generally to computer systems, and more particularly to a system and method to improve information search and retrieval utilizing a multilevel analysis wherein users are guided to desired information based upon determined probabilities and feedback received from a clarification dialog.

BACKGROUND OF THE INVENTION

Search information and retrieval systems are common tools enabling users to find desired information relating to a topic. From Web search engines to desktop application utilities (e.g., help systems), users consistently utilize information and retrieval systems to discover unknown information about topics of interest. In some cases, these topics are prearranged into topic and subtopic areas. For example, "Yahoo" provides a hierarchically arranged predetermined list of possible topics (e.g., business, government, science, etc.) wherein the user will select a topic and then further choose a subtopic within the list. Another example of predetermined lists of topics is common on desktop personal computer help utilities wherein a list of help topics and related subtopics are provided to the user. While these predetermined hierarchies may be useful in some contexts, users often need to search for/inquire about information outside of and/or not included within these predetermined lists. Thus, search engines or other search systems are often employed to enable users to direct user-crafted queries in order to find desired information. Unfortunately, this often leads to frustration when many unrelated files are retrieved since users may be unsure of how to author or craft a particular query. This often causes users to continually modify queries in order to refine retrieved search results to a reasonable number of files.

As an example of this dilemma, it is not uncommon to type in a word or phrase in a search system input query field and retrieve several thousand files—or millions of web sites in the case of the Internet, as potential candidates. In order to make sense of the large volume of retrieved candidates, the user will often experiment with other word combinations to further narrow the list since many of the retrieved results may share common elements, terms or phrases yet have little or no contextual similarity in subject matter. This approach is inaccurate and time consuming for both the user and the system performing the search. Inaccuracy is illustrated in the retrieval of thousands if not millions of unrelated files/sites the user is not interested in. Time and system processing speed are also sacrificed when searching massive databases for possible yet unrelated files.

Generally, conventional search systems will search for information in a flat or non-hierarchical manner that can exacerbate the accuracy and speed problems described above. In other words, the search system will attempt to match or find all topics relating to the user's query input regardless of whether the "searched for" topics have any contextual relationship to the topical area or category of what the user is actually interested in. As an example, if a user were to input the word "Saturn" into a conventional search system, all types of unrelated results are likely to be "searched for" and returned such as relating to cars, car dealers, planets, computer games, and other sites having the word "Saturn". Similar results are also achieved with phrases wherein many unrelated topics may be "searched for" and returned in response to the combination of words in the phrases. Consequently, as a result of conventional flat, non-hierarchical search architectures, wherein substantially all potential topics are analyzed for common elements or element combinations of the query input, and as a result of ever increasing databases for storing these topics, user frustrations continue to grow and system performance decreases as more and more potential "search results" are returned having related elements but little contextual similarity.

In view of the above problems associated with conventional search and information retrieval systems, there is a need for a system and/or methodology to mitigate search and retrieval of unrelated information and to facilitate finding information without having to continually author or craft ever more sophisticated queries.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate improved search and retrieval of information. Information is analyzed according to a hierarchical architecture of L layers, wherein respective layers are further analyzed according to N broader categorical areas, the categorical areas having one or more possible topics, wherein L and N are integers. It is noted that categories, topics and/or subtopics are distinguished as such for exemplary purposes, however, it is to be appreciated that similar processing (e.g., algorithms) can be employed across/within these respective designations. The categorical areas and topics can have automatically determined and/or assigned probabilities (e.g., weights). These probabilities are based upon a determination regarding the likelihood that information related thereto will be associated with a query (e.g., user and/or system input requesting information) that is directed at seeking information relating to the areas and/or topics. The probabilities may be determined automatically via classifiers that are hierarchically configured (e.g., higher level classifiers determining sublevel classifiers) and are constructed to analyze the areas and related topics. The hierarchical analytical approach facilitates both speed and accuracy over conventional systems. High-level classifiers enable search requests to be narrowed to a more definite categorical area in a rapid manner, wherein sub-classifiers employed for each categorical area may be trained to provide more accurate models for retrieving desired information within a category. These classifiers may include hierarchically configured Support Vector Machines, Naive Bayes, Bayes Net, decision tree learning models, similarity-based and/or other vector-based information retrieval methods such as cosine-based computation, for example. A hand-crafted approach may also be applied to assign predetermined probabilities to a hierarchical analytical structure of areas and topics.

A dialog (e.g., audio feedback, text feedback) is employed in order to aid the user in refining and distinguishing between one or more possible areas the user may be interested in—but, possibly unsure of how to inquire about. For example, a user may direct a query in accordance with the present invention relating to a particular information topic (e.g., formatting). As an example, the dialog may initially ask the user to disambiguate between formatting text, formatting hard drives, or formatting printers based upon determined probabilities relating to the query and the categorical areas. If the user selects text as a broad area, for example, further dialog may be initiated wherein the next most probable areas relating to text formatting are presented. In this manner, a user may retrieve information without having to understand which word or phrase combinations are necessary to acquire information on a given subject. Moreover, based upon the user's response to the dialog, the user is presented with the most likely area of interest in subsequent dialog feedback to further refine the search and without having to peruse unrelated information. Dialog ranges from sophisticated text-generation engaging the user to clarify the area of focus, to a simpler presentation of a list containing topics that the user may desire to review, coupled with a question seeking feedback from the user that can disambiguate the focus of the list.

It is to be appreciated that substantially any type of information may be similarly analyzed and retrieved. For example, web and/or other information may be hierarchically analyzed according to automatically determined areas and topics wherein the dialog may be employed to further aid the user in retrieving related topic information. In accordance with another aspect of the present invention, data logs and user activity monitoring may be employed to further refine classification models and/or include other categories or topics.

According to one aspect of the present invention, an information retrieval system is provided. The system includes a hierarchal analysis component that receives a query and processes probabilities associated with N categories, each category having one or more topics, N being an integer, and an interactive component that provides feedback derived from the query and the probabilities associated with the N categories and the one or more topics. The feedback is utilized to determine at least one category of the N categories to facilitate retrieval of at least one of the one or more topics.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology to facilitate improved search and retrieval of information. A modular and coherent analytical system and process is provided wherein large amounts of data are initially analyzed according to a hierarchical determination of broad categorical areas of interest associated with a query. Respective categorical areas are further related to a plurality of topics and subtopics of information pertaining to that area. Dialog and/or other types of feedback are employed to enable disambiguation amongst the categorical areas. Based upon the feedback and the query, a subsequent search for desired information is conducted in a more narrow and precise range of topics associated with one or more of the categorical areas. In this manner, accuracy and speed is improved over conventional search and information systems that attempt to retrieve information from all possible topics associated with the query in a flat or non-hierarchal manner. Accuracy is improved since the feedback provided by the user enables refinement of the search to topics that are most likely of interest to the user—mitigating having the user experiment with alternate query formulations to find desired information. Moreover, the user is less likely to have to peruse a list of retrieved information files that may have common elements but no subject matter relationship (e.g., "Mustang" search retrieving files relating to cars, horses, music). Retrieval speed and performance is improved since the search is narrowed to a categorical area. Thus, unrelated topics are substantially excluded from the refined search of the present invention thereby improving system performance. In addition, more accurate classifiers can be developed to distinguish among items within a categorical area.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, both an application running on a server and the server can be a component.

Figure 1:
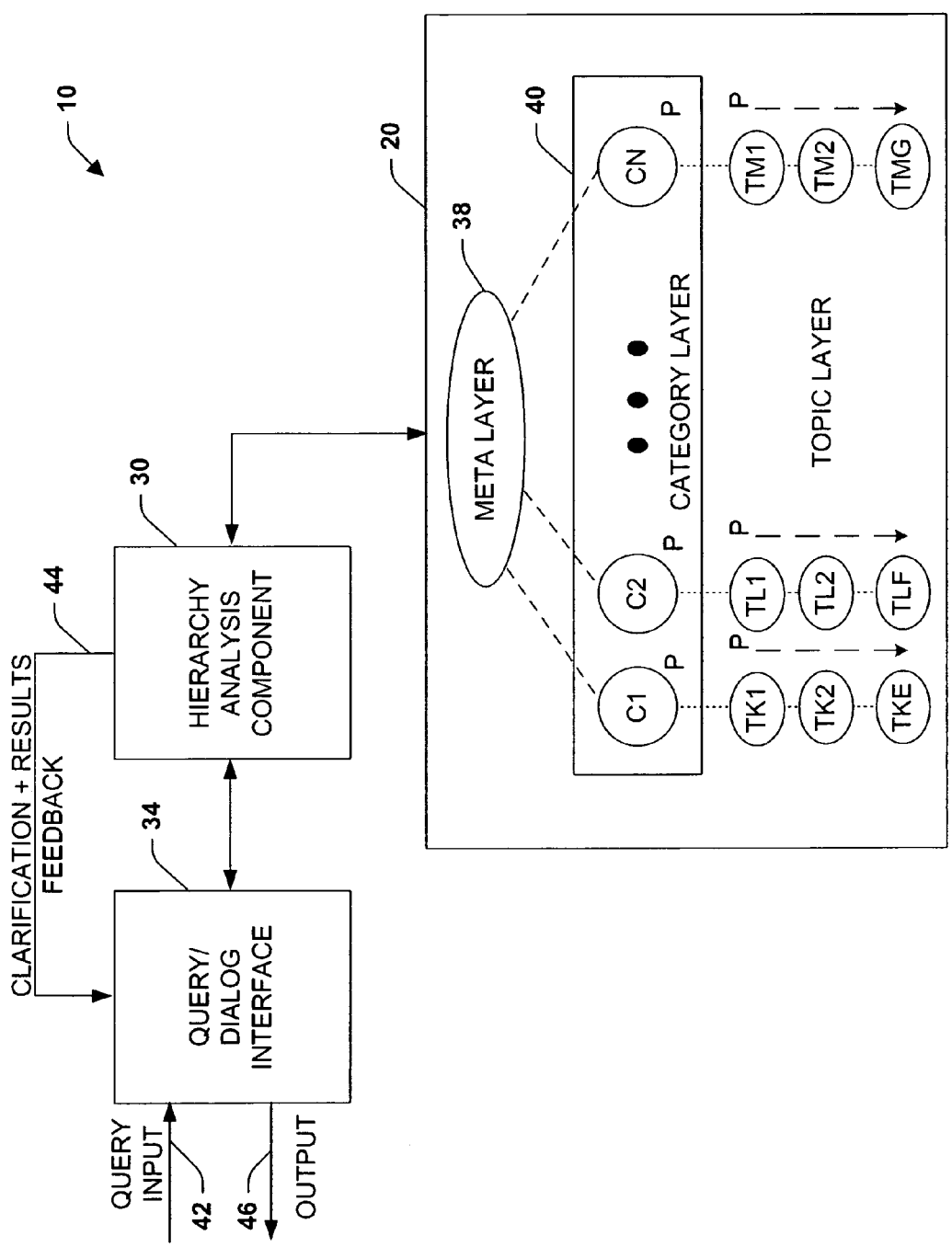
FIG. 1 is a schematic block diagram illustrating a hierarchical information and retrieval system in accordance with an aspect of the present invention.

Referring initially to FIG. 1, a system 10 illustrates a hierarchical information search and retrieval system in accordance with an aspect of the present invention. The system 10 includes a hierarchically determined architecture of probabilistic layers 20, a hierarchy analysis component 30 and a query/dialog interface 34. The layers 20 can include a meta layer 38 for determining probabilities P of a category layer 40. The category layer 40 includes several broader category areas that are denoted as C1 through CN, N being an integer, wherein each category area is associated with a plurality of topics denoted as TK1 through TKE, TL1 through TLF, and TM1 through TMG, wherein E, F, and G are integers, respectively. It is to be appreciated that although three layers are depicted in the layers 20, other layers and hierarchies are possible. As will be described in more detail below, the probabilities P may be automatically determined by hierarchically configured classifiers wherein a top-level classifier is configured for the meta layer 38 and sublevel classifiers are configured for each category area C1–CN. It is noted that probabilities may also be predetermined for the layers 20 and will be described in more detail below according to an alternative aspect of the present invention in relation to FIG. 8.

The topics may refer to substantially any information or subject matter. The categories provide a broader classification of the topics that relate to a particular category. For example, the categories may refer to well-known areas of a help utility such as printing, formatting, creating, viewing, editing, saving, etc. wherein the topics are then related to each category. As an example, there may be a "properties" topic associated with each category that provides different information on properties depending on which category the topic is associated. It is to be appreciated that substantially any type of information may be similarly analyzed and classified in accordance with the present invention. This information may include Web content and/or other remote/local data sources wherein topical information is stored.

The query/dialog interface 34 receives a query input 42 that is subsequently processed by the hierarchy analysis component 30 (HAC). This processing includes determining the most likely category areas to be displayed to the user and also may subsequently include retrieved results of likely topics associated with a category. The HAC 30 receives the query input and analyzes the input in conjunction with the meta layer 38. The meta layer 38 provides probabilities of the most likely categories associated with the query input 42 to the HAC 30. Based upon the probabilities and subsequent analysis that is described in more detail below, the HAC 30 may provide feedback 44 to the query dialog interface 34 to inquire which of the categories the user is most likely interested in at a display output 46 and/or other type of computer system output. It is noted that users may select one or more categories of interest. Based upon a selection of a desired category and/or categories by the user at the interface 34, the HAC 30 then drives the category layer 40 along with the query input to retrieve related topics associated with the selected category. These topics may then be provided to the query/dialog interface 34 wherein the results may be displayed to the user at the output 46.

By providing the hierarchical architecture of the present invention, a modular and coherent structure is formed thus enabling developers to modularize tasks within categories and topics. Thus, tedious and time-consuming relationships do not have to be predetermined between all topics and categories. In this manner, a development team can be assigned to each category with responsibilities for providing only those topics pertaining to that category. By utilizing clarification from the user regarding the desired category of interest, the present invention improves system speed and accuracy over conventional search systems. Speed is improved because the clarification feedback enables the system 10 to refine searches to the category of interest without searching other categories and topics. Accuracy is improved since more accurate sublevel classifiers may be constructed for the topics when the sublevel classifiers are refined to a narrower and more well-defined area.

Figure 2:
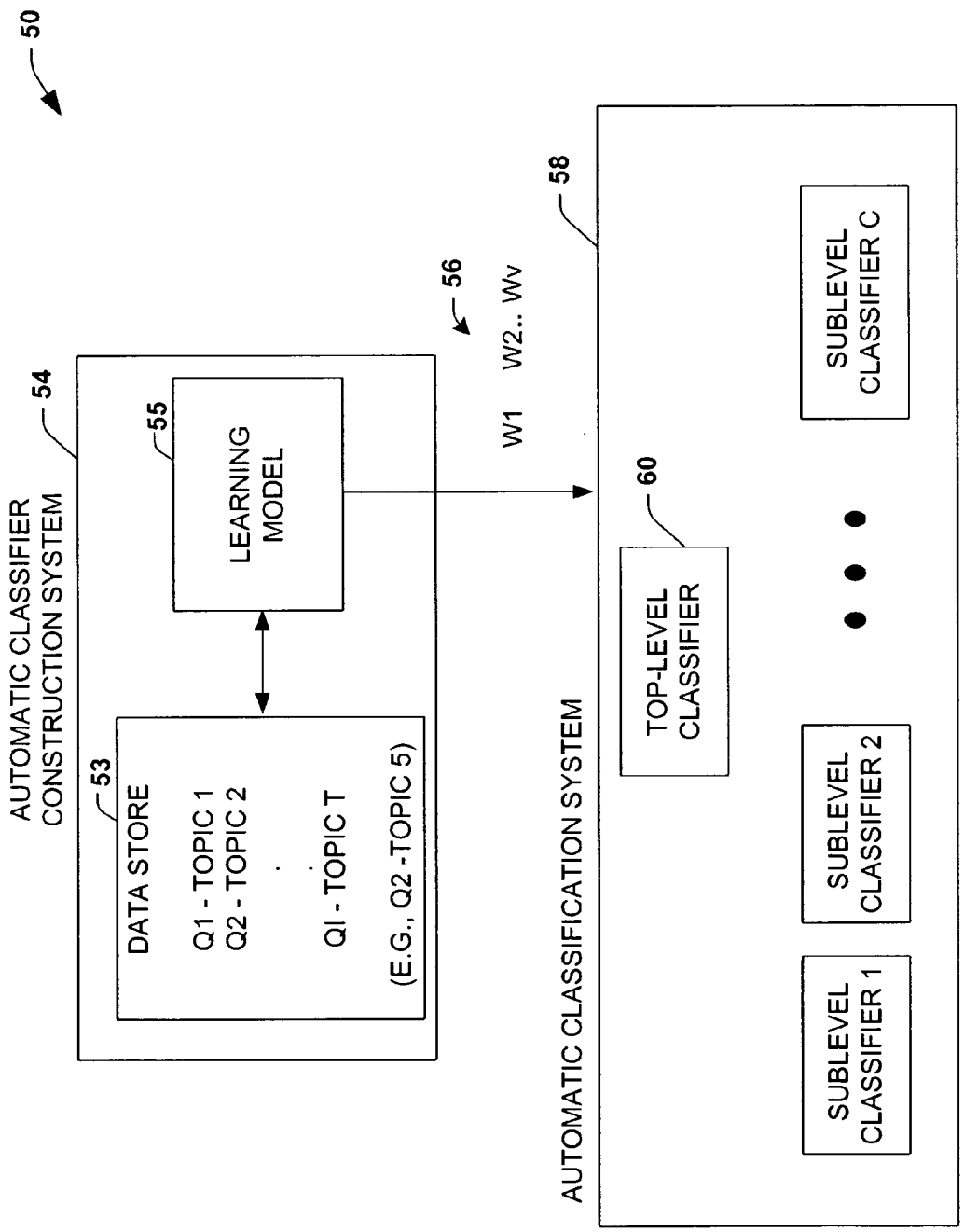
FIG. 2 is a schematic block diagram illustrating an automatic classifier construction system and an automatic classification system in accordance with an aspect of the present invention.

Referring now to FIG. 2, a system 50 illustrates an automatic classifier construction system 54 (ACCS) for building run-time classifiers within an automatic classification system 58 (ACS). The ACS 58 determines the probabilities described above in relation to FIG. 1 for the layers 20. A top-level classifier 60 is configured by the ACCS 54 to determine probabilities for the meta layer 38. In response to a query input vector, the top-level classifier 60 determines probabilities of the most likely category areas associated with the query input. Based on the probabilities determined by the top-level classifier 60, the query input, and the clarification feedback described above, sublevel classifiers 1 through C, C being and integer, associated with each category are then employed to determine probabilities of the most likely topics within the category area. In this manner, a hierarchy of classifiers is provided wherein a query is first refined to a possible area of interest via the top-level classifier 60 and then utilized with a more narrowly defined sublevel classifier 1 through C for each category area in order to retrieve desired topic results that are contextually related.

According to one aspect of the invention Support Vector Machines (SVM) which are well understood are employed as the classifiers. It is to be appreciated that other classifier models may also be employed such as Naive Bayes, Bayes Net, decision tree, similarity-based, vector-based, and/or other learning models. SVM's are configured via a learning or training phase within the ACCS 54. A classifier is a function that maps an input attribute vector, $x=(x1, x2, x3, x4, xn)$, to the confidence that the input belongs to a class—that is, $f(x)=$confidence(class). In the case of topic classification, attributes are words in a query or other domain-specific attributes derived from the words in a query (e.g., parts of speech, presence of key terms), and the classes are the categories or areas of interest. An important aspect of SVMs and other inductive-learning approaches is to employ a training set of labeled instances to learn a classification function automatically. The training set is depicted within a data store 53 associated with the ACCS 54. As illustrated, the training set may include a subset of queries 1 through I that indicate potential and/or actual elements or element combinations (e.g., words or phrases) that are employed to inquire about a particular topic. As illustrated, the data store 53 also includes a plurality of topics 1 through T. Each query can be associated with one or more topics (e.g., (Q1,T2,T3, T9), (Q7,T2,T6), (Q2,T5)). During learning, a function that maps the input features to a confidence of class is learned. Thus, after learning a model, respective topics are represented as a weighted vector of input features. It is noted that other implementations of queries and/or topics are possible. For example, another generalization can be employed to train not only on queries for topics and subtopics, but also on the raw text associated with a target content and/or documents. In other words, a system can be booted with a few queries, but provided with a plurality of raw text, and also add not only queries but raw text later to enhance the system.

For topic classification, binary feature values (e.g., a word occurs or does not occur in a topic), or real-valued features (e.g., a word occurs with importance weight r) are often employed. Since topic collections may contain a large number of unique terms, a feature selection is generally employed when applying machine-learning techniques to topic categorization. To reduce the number of features, features may be removed based on overall frequency counts, and then selected according to a smaller number of features based on a fit to the categories. The fit to category can be determined via mutual information, information gain, chi-square and/or any other statistical selection techniques. These smaller descriptions then serve as input to the SVM. It is noted that linear SVMs provide suitable generalization accuracy and provide fast learning. Other classes of nonlinear SVMs include polynomial classifiers and radial basis functions and may also be utilized with the present invention.

The ACCS 54 employs a learning model 55 in order to analyze the queries and topics in the data store 53 to learn a function mapping input vectors to confidence of class. For many learning models, including the SVM, the model for each category can be represented as a vector of feature weights, w 56 (e.g., w1, w2, wv). Thus, there is a learned vector of weights for each category. When the weights 56 are learned, new queries are classified by computing the dot product of x and w, wherein w is the vector of learned weights for the respective categories, and x is the vector representing a new query. A sigmoid function may also be provided to transform the output of the SVM to probabilities. Probabilities provide comparable scores across categories or classes.

An SVM is a parameterized function whose functional form is defined before training. Training an SVM generally requires a labeled training set, since the SVM will fit the function from a set of examples. The training set consists of a set of E examples, E being an integer. Each example consists of an input vector, x, and a category label, y, which describes whether the input vector is in a category. For each category there are E free parameters in an SVM trained with E examples. To find these parameters, a quadratic programming (QP) problem is solved as is well understood. There is a plurality of well-known techniques for solving the QP problem. These techniques may include a Sequential Minimal Optimization technique as well as other techniques such as chunking.

Figure 3:
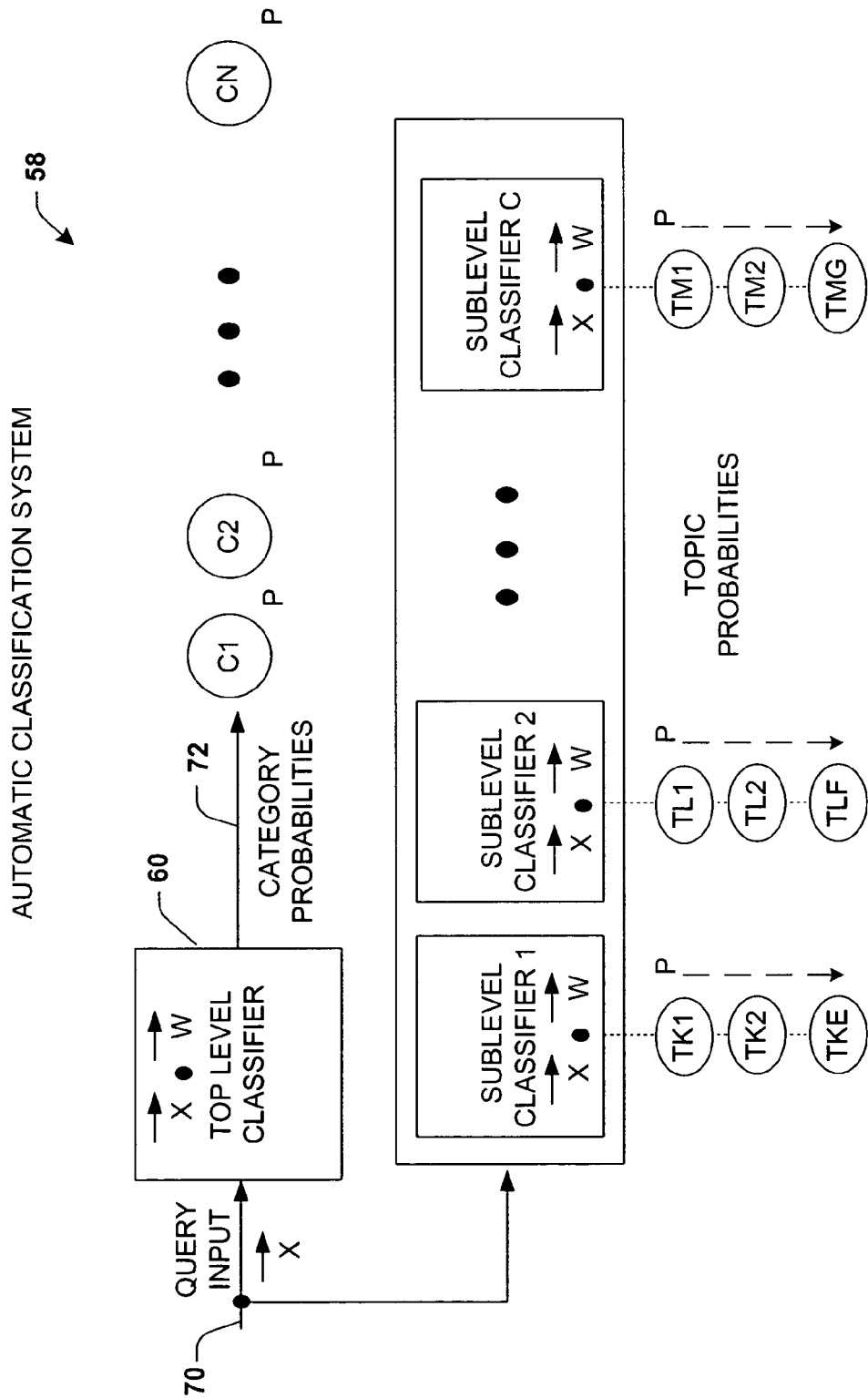
FIG. 3 is a schematic block diagram illustrating a more detailed automatic classification system in accordance with an aspect of the present invention.

Turning now to FIG. 3, a more detailed illustration is provided for the ACS 58. A query input 70 that has been transformed into an input vector x is applied to the top-level classifier 60 for each category. The top-level classifier 60 utilizes the learned weight vectors w determined by the ACCS 54 (one weight vector for each top-level category) and forms a dot product to provide an output 72 of category probabilities P. As will be described in more detail below in relation to FIG. 4, the category probabilities are analyzed by an analytical component to provide clarification and/or dialog feedback to a user. The feedback provides a display of the most likely categories that are related to the user's query. Based upon some input from the user clarifying/selecting one or more categories of interest C1 through CN, sublevel classifiers are then employed that relate to the category areas selected by the user. The particular sublevel classifier then utilizes the query input to determine probabilities for topics that are associated with the category areas. The analytical component may then display the relevant topics based upon the determined probabilities. In this manner, a hierarchical system is formed wherein category areas are first disambiguated by enabling the user to select the most relevant contextual category area. The sublevel classifiers may then be constructed according to the confines of the particular category thus enabling much more accurate searches within the topics. Furthermore, system speed is improved by narrowing the search to a category area of contextually related topics since all other category areas may be excluded during the search. It is noted that a single weight vector is depicted in the top-level classifier 60 and the sublevel classifiers 1 though C for the sake of clarity. It is to be appreciated however, that a different weight vector may be employed for the top-level classifier and for each of the sublevel classifiers.

Figure 4:
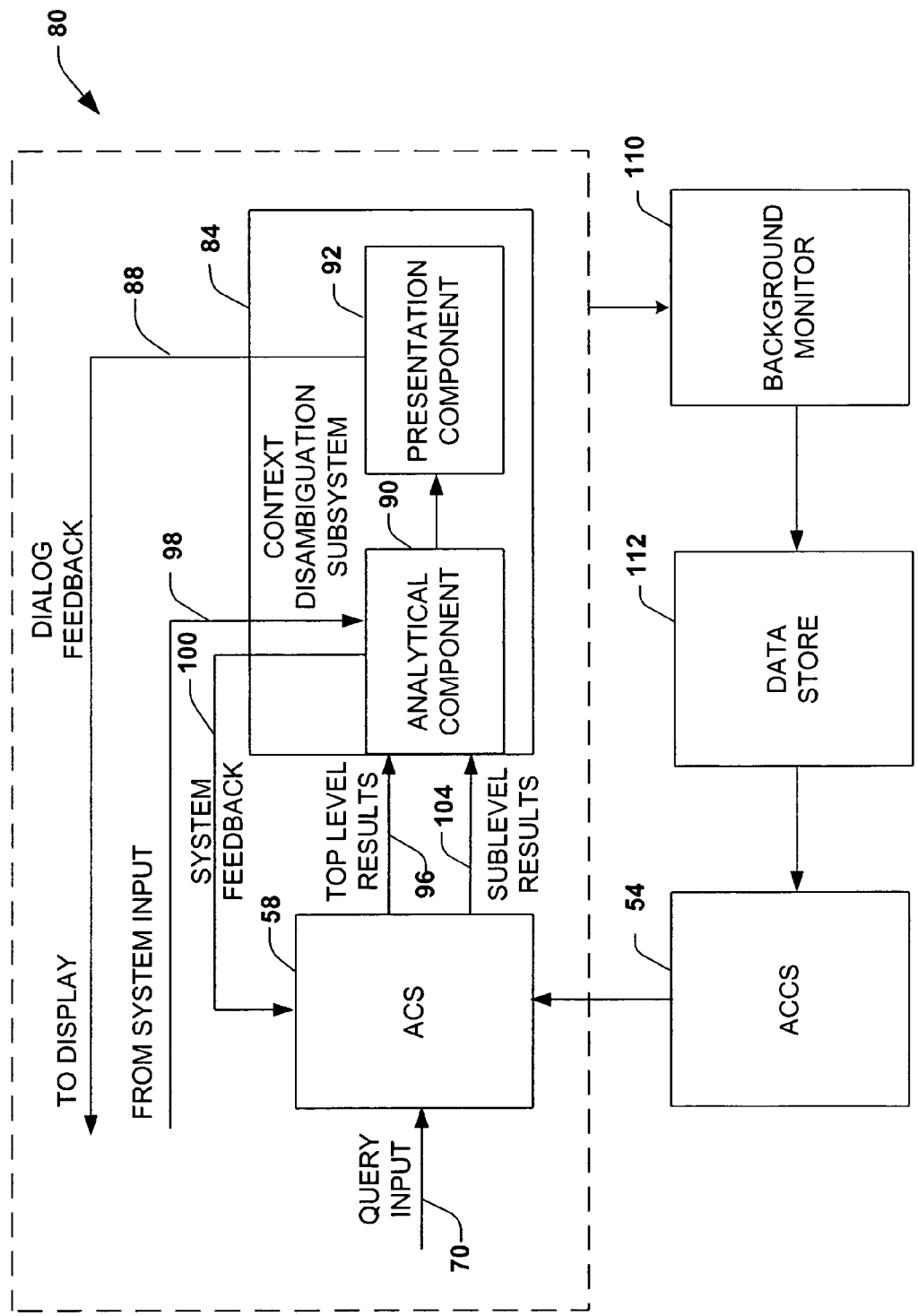
FIG. 4 is a schematic block diagram illustrating a more detailed information and retrieval system in accordance with an aspect of the present invention.

Referring now to FIG. 4, a system 80 depicts a more detailed information search and retrieval system in accordance with the present invention. The system 80 includes an interactive component such as a context disambiguation system (CDS) 84 for analyzing the probabilistic results from the ACS 58, controlling a dialog feedback 88 to a display or other computer system output (not shown), and rendering search results to the display. The CDS 84 includes an analytical component 90 and a presentation component 92 for directing output to the computer system. The output may include text, audio and/or other feedback relating to the search results/dialog feedback 88. As described above, the query input 70 is provided to the ACS 58 wherein a top-level results output 96 is initially directed to the analytical component 90. The top-level results 96 are the probabilistic weights determined for the category areas by the top-level classifier in the ACS 58.

The results 96 are processed by the analytical component 90 to disambiguate the category areas based on the determined probabilities. Upon determining the most likely category areas, which is described in more detail below, the analytical component 90 drives the presentation component 92 to display these category areas via the dialog feedback 88. The dialog may range from sophisticated text-generation engaging the user to clarify the category area of focus, to a simpler presentation of a list containing topics that the user may desire to review, coupled with a question seeking feedback from the user that can disambiguate the focus of the list. Upon reviewing the dialog, the user then indicates one or more suitable category areas via a selection input 98 such as a mouse, keyboard or other input. Based upon the user's selection, the analytical component drives a system feedback 100 to indicate the category areas selected. The ACS 58 enables a sublevel classifier associated with the category area indicated by the system feedback 100 and utilizes the query input 70 to determine a sublevel result 104 indicating the most likely topics relating to the category area. The analytical component 90 may then determine which topics should be directed to the presentation component 92 based upon the probabilities contained in the results 104. These topics are then provided to the user as search results via the dialog feedback 88 wherein the user may then select the desired topic of interest to review. This process can be repeated for respective levels in the hierarchy, thus a sublevel loop can be iterated over a number of times.

Several analytical techniques and policies based on probabilities may be applied by the analytical component 90 to the top and sublevel results 96 and 104 in determining the dialog feedback 88 to display. These techniques may include a statistical cost benefit analysis and/or decision analysis to determine whether to inquire for more feedback 88 from the user or when to display search results. For example, based upon the spread of probabilities across the categories and topics (e.g., probabilities equally weighted across many categories or heavily weighted toward a few categories), it may be determined that dialog feedback posing a question is necessary to help clarify which category the user may be interested in. If the probabilities were heavily weighted toward a single category, it may be determined to directly display topics without first requiring feedback, for example. These decisions may be base upon a rule-based policy that controls if and how dialog should be invoked based on the distribution of probabilities assigned to topics at one or more layers of the classification scheme. For example, a rule may be established that the top five results are displayed unless the probability for the category or topic is below a predetermined probability threshold. Alternatively, an expected-utility policy may be utilized that controls if and how dialog should be invoked based on the distribution of probabilities assigned to topics at one or more layers of the classification scheme. These type of policies may be based on assigning costs associated with the display and browsing of sets of results versus the costs of the steps of inquiring more feedback. The costs may be multiplied by topic or category probabilities to determine the expected-utility of displaying a result or question.

Other decision-making techniques and/or policies provided by the analytical component can include a cost-benefit analysis that considers the cost of the dialog with the information value of the dialog. This can also include a decision analysis for determining the nature and quantity of a clarification dialog, for example. Still yet other analyses can include a computation of the value of information associated with feedback gained during a clarification dialog to guide the nature and quantity of the clarification dialog. This can include employing an expected value of information (EVI) construct that is well-known within the fields of decision theory and analysis.

Another aspect of the present invention includes providing a background monitor 110 to monitor explicit and/or implicit user responses/actions within the system 80. For example, the background monitor 110 may receive inputs from various locations within the system 80 and record those instances of direct and/or indirect activity associated with the inputs within a local data store 112. These inputs may include the query input 70, the top and sublevel results 96, 104, dialog feedback 88 and the system feedback 100, for example. Explicit monitoring refers to those actions directly initiated by the user such as the content of the query itself and subsequent selections based upon the dialog feedback 88. Implicit monitoring refers to making determinations regarding temporal aspects of the user responses. For example, these aspects may include how long a particular user pauses based upon a particular dialog. The data store 112 may then be provided to the ACCS 54 in order to provide updated classifier models to the ACS 58.

Figure 5:
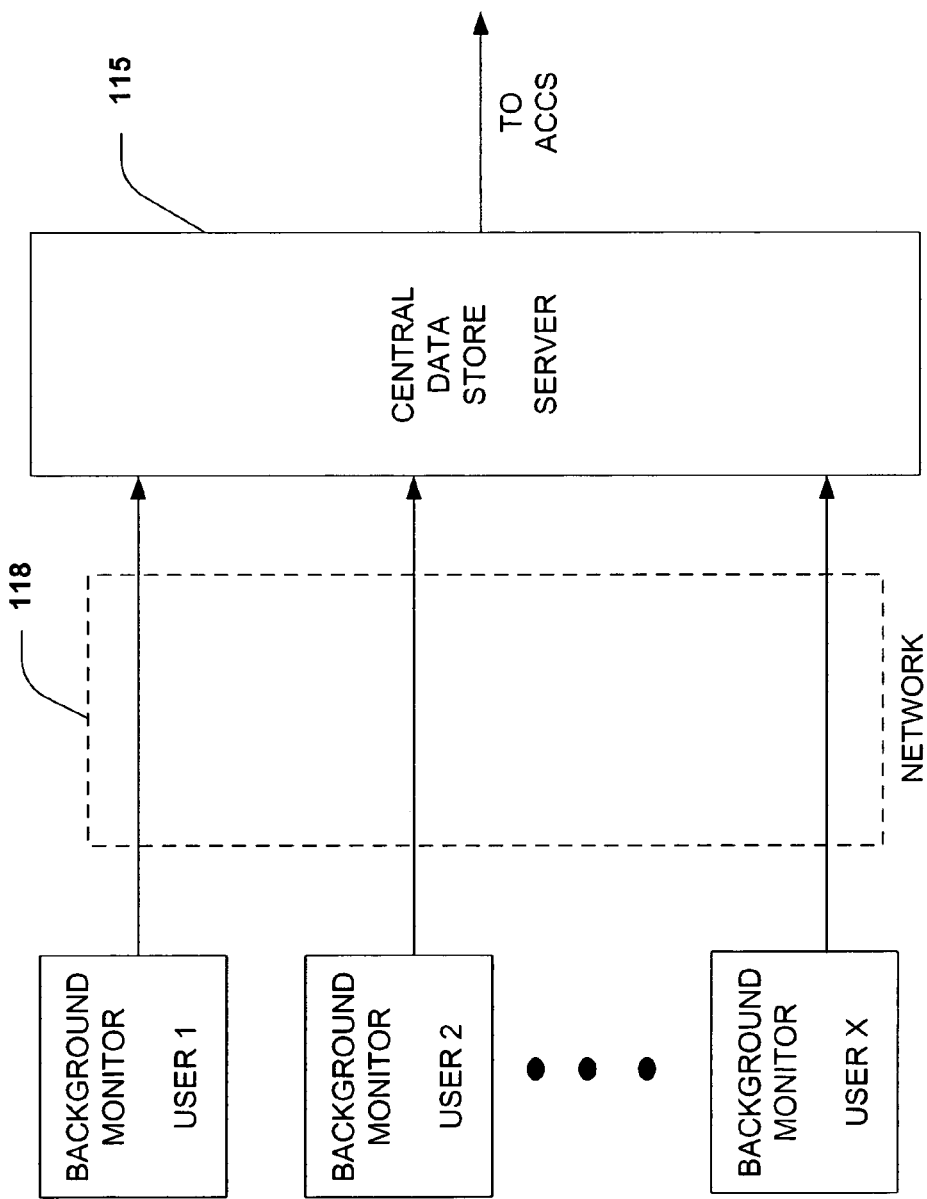
FIG. 5 is a schematic block diagram illustrating a central server and data store in accordance with an aspect of the present invention.

Turning now to FIG. 5, a central data store and server 115 is provided to receive input data over a network 118 from a plurality of background monitors associated with a plurality of users 1 through X. In this manner, queries and other types of monitoring may continuously be collected and utilized to generate more accurate classifiers for the ACCS 54. Also, it may be determined from the input data that other categories and/or topics should be developed if it is determined that some queries inquire about topical information not previously considered and/or stored.

Figure 6:
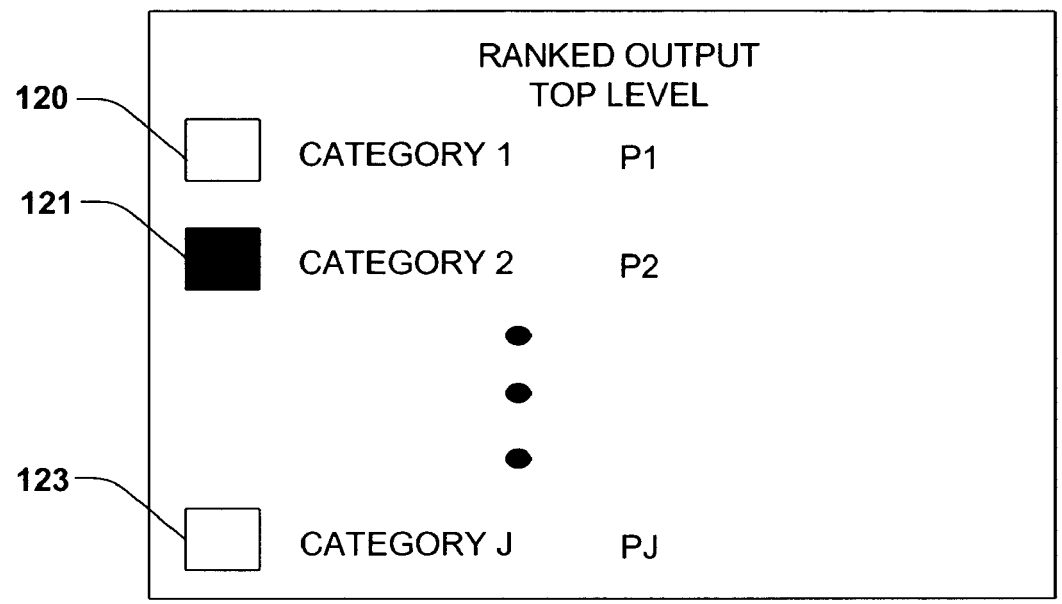
FIG. 6 is a diagram illustrating a top-level display presentation in accordance with an aspect of the present invention.
Figure 7:
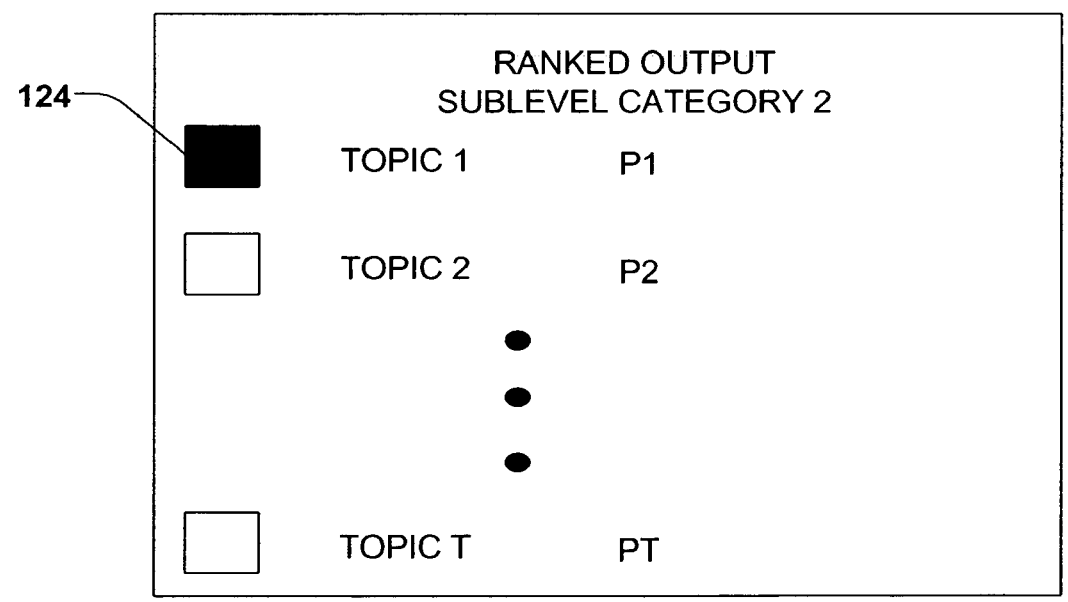
FIG. 7 is a diagram illustrating a sub-level display presentation in accordance with an aspect of the present invention.

Referring now to FIGS. 6 and 7, and exemplary display presentation is illustrated in accordance with the present invention. FIG. 6 depicts a ranked display of potential categories 1 through J that have been determined by the analytical component 90 described above. Selection inputs 120–123 may be provided next to each displayed category to enable the user to input feedback regarding the category area or areas of interest. The ranked displayed may also include probabilities P1 through PJ indicating the likelihood that a particular category may be desired for the user. In this example, the user may select Category 2 as the category of interest. Based upon the selection, a display presentation as depicted in FIG. 7 may be provided. In this example, potential topics ranked 1 through T associated with the users query and relating to Category 2 are then displayed. As illustrated, the topics may also include probabilities. In this example, the user may select topic 1 at reference numeral 124 to retrieve information associated with the selected topic.

Figure 8:
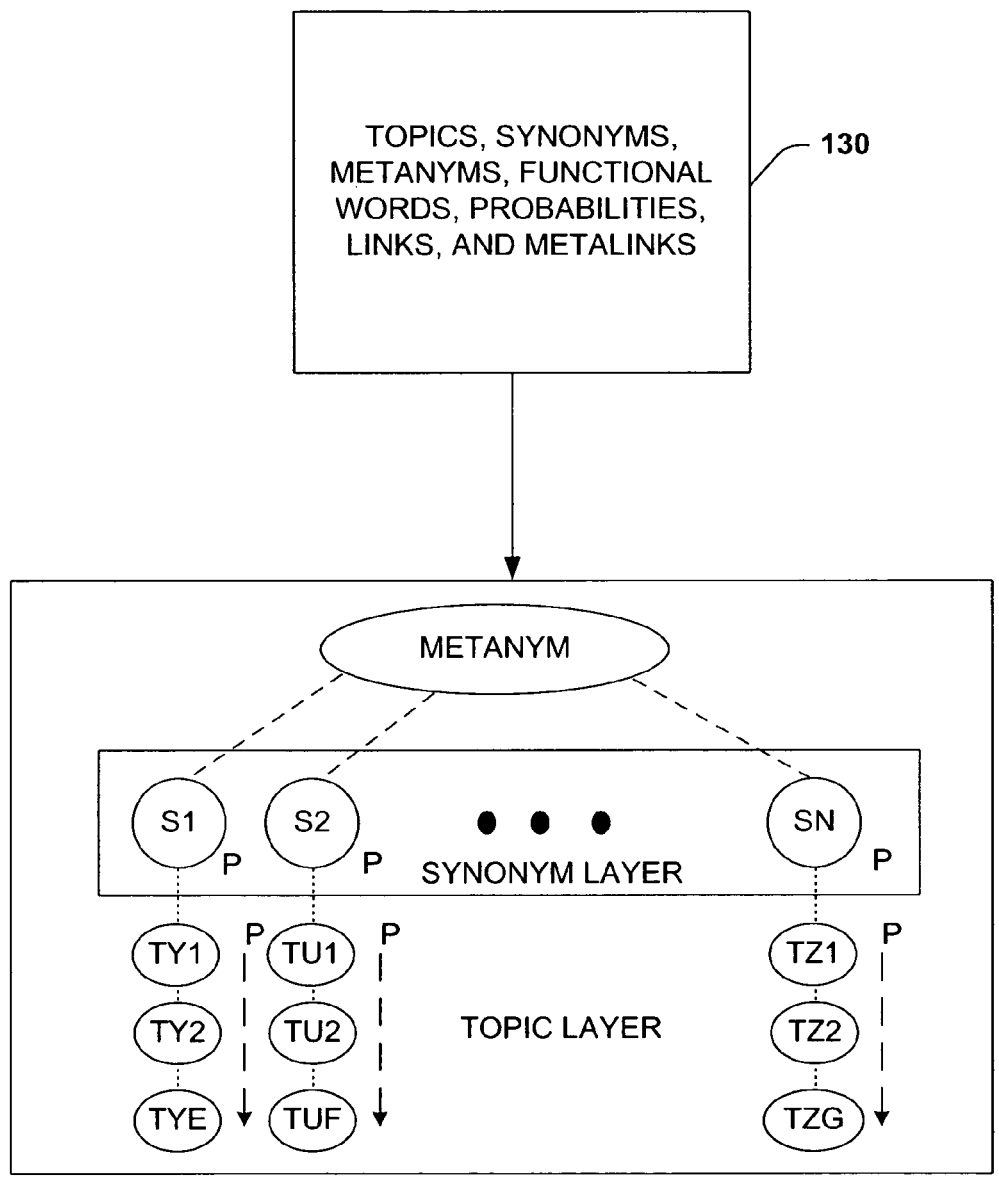
FIG. 8 is a diagram illustrating an alternative hierarchical model in accordance with an aspect of the present invention.

Referring to FIG. 8, an alternative aspect of the present invention is depicted relating to probabilities for the layers 20. As described above, probabilities may be determined via classifiers. According to this aspect of the invention, these probabilities may also be predetermined and stored on a database 130. The database 130 of the present invention contains various information utilized by the analytical component 90 to process the queries and determine potential categories and topics. This information may consist of seven data types, for example: topics, synonyms, metanyms, functional words, probabilities, links, and metalinks.

The "topics" are the types of on-line assistance provided to a user. An example of a topic may be "create a new chart," which would provide information to a user of a spreadsheet program on how to create a chart. The topics are written off-line by the developers of the software product based on the types of problems that users usually have in utilizing the software product. Associated with each topic of the present invention is a "prior probability." The prior probability is the likelihood that a user would need a particular topic in the absence of any other information. For example, the topic "create a new chart" may have a prior probability of 0.05, whereas the topic "edit a custom chart using a macro" might have a prior probability of 0.01. The value of these two prior probabilities indicates that the "edit a custom chart using a macro" topic is much less likely to be needed by a user. The prior probabilities are created by the developers of the software product based on experience and customer research.

The "synonyms" data type are words that a user may use to refer to each topic (i.e., their help needs). For example, for the topic "create a new chart" the synonyms may include "new," "chart," "graph," "make," "create," and "picture." The synonyms for each topic are created off-line by the software product developers based on experience and customer research.

The "metanyms" data type is a general classification for synonyms. That is, a metanym is a higher-level conceptual grouping of synonyms. For example, the synonyms "blue," "red," "green," and "yellow" can be grouped into the metanym "color." Another example is the synonyms "chart" and "graph" can be grouped into the metanym "chart." Metanyms can also be a higher-level grouping of spelling variations, as well as different types of contractions. By utilizing metanyms, the present invention reduces the number of words that are considered when performing probability analysis. Metanyms are created off-line by the software developers based on experience and customer research.

The "functional words" data type is a grouping of common articles, possessives, demonstratives, prepositions, and other similar words. Functional words are used in definiteness analysis to determine the form of a word. For example, the word "my" in the phrase "my chart" indicates that "chart" is in the definite form, whereas the word "a" in the phrase "a chart" implies that "chart" is in the indefinite form. The list of functional words comes from the experience of the software developers, as well as customer research.

The "probabilities" data type indicates the likelihood that a user will use a particular metanym to identify a topic. For example, if a customer wants the "create a new chart" topic, there is a high probability that the user will use the word "chart" in the input. However, if the user wants the "print a document" topic, there is a much lower probability that the user will use "chart" in the input. The probabilities are created off-line based on the experience of the software developers and customer research.

The "links" data type is a connection between a metanym and a topic. Therefore, a link is employed to indicate that a metanym may be used to refer to a topic. A "link relevance" is maintained as part of the link data type. The link relevance is an indication of the expectation that a metanym will be used in a definite form, an indefinite form, or a neutral form when a user requests the linked topic. For example, it is more likely when a user requests the "create a new chart" topic that a user will use the indefinite form as opposed to the definite form, because the chart does not exist yet. Links are created based on the experience of the software developers and customer research. The "metalinks" data type is used to link synonyms with the associated metanym. As with all other data types, metalinks are created off-line using the experience of the software developers and customer research.

Figure 9:
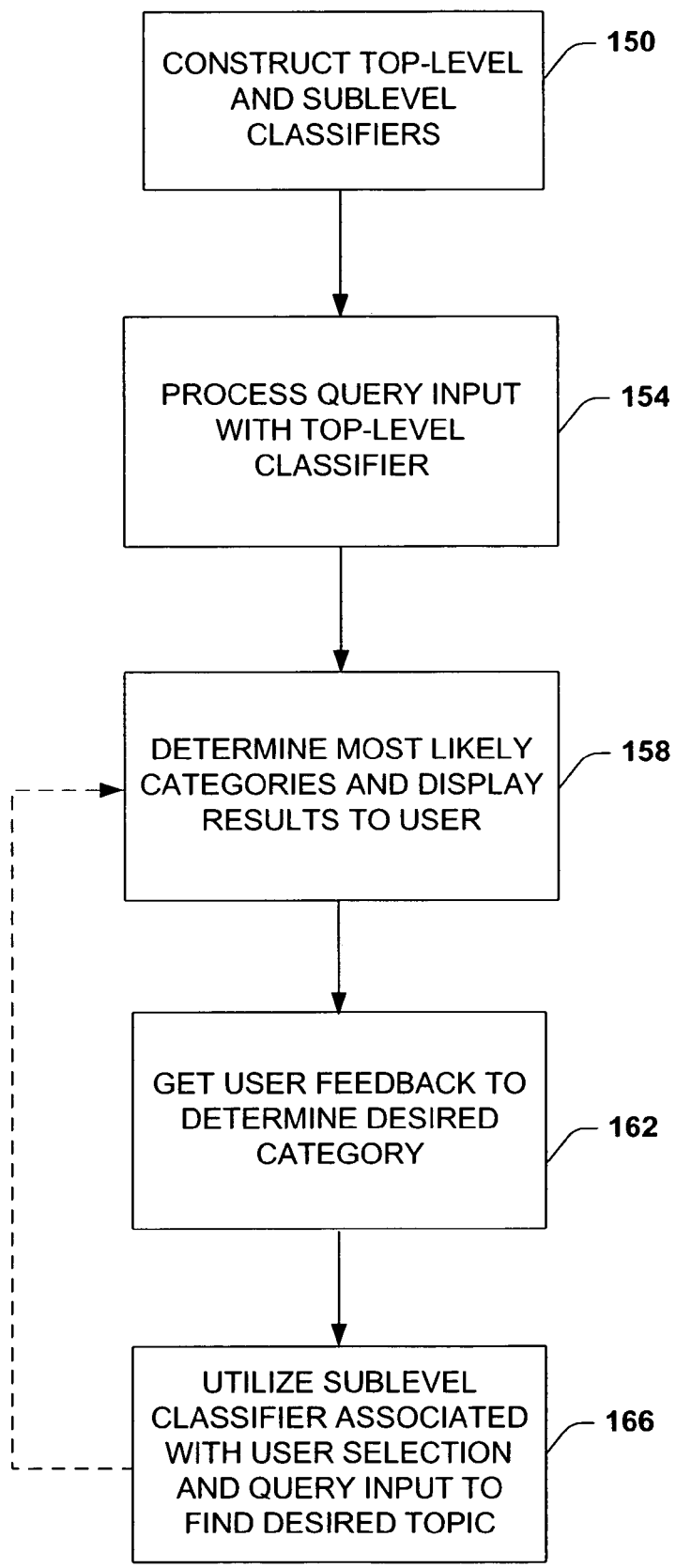
FIG. 9 is a flow diagram illustrating a methodology providing improved information search and retrieval in accordance with an aspect of the present invention.

FIG. 9 illustrates a methodology for providing information search and retrieval in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring to FIG. 9, and proceeding to 150, top-level and sublevel classifiers are constructed as described above for determining probabilities associated with a query. At 154, a query is processed in conjunction with the top-level classifier in order determine the probabilities associated with a category area. At 158, the most likely categories are determined based upon the probabilities determined in 154 and the results are provided to the user. As described above, policies may be established to determine the categories that are actually provided and/or displayed to the user. At 162, user feedback is received in the form of a category selection provided by the user relating to a desired area of interest. At 166, a sublevel classifier associated with the category relating to the users selection in 162 is employed to find a desired topic utilizing the query input. As described above, when categories and topics are displayed, associated probabilities may also be displayed that relate to a particular topic or category. It is noted that acts 158 through 166 can be iterated for each respective level of the hierarchy.

Figure 10:
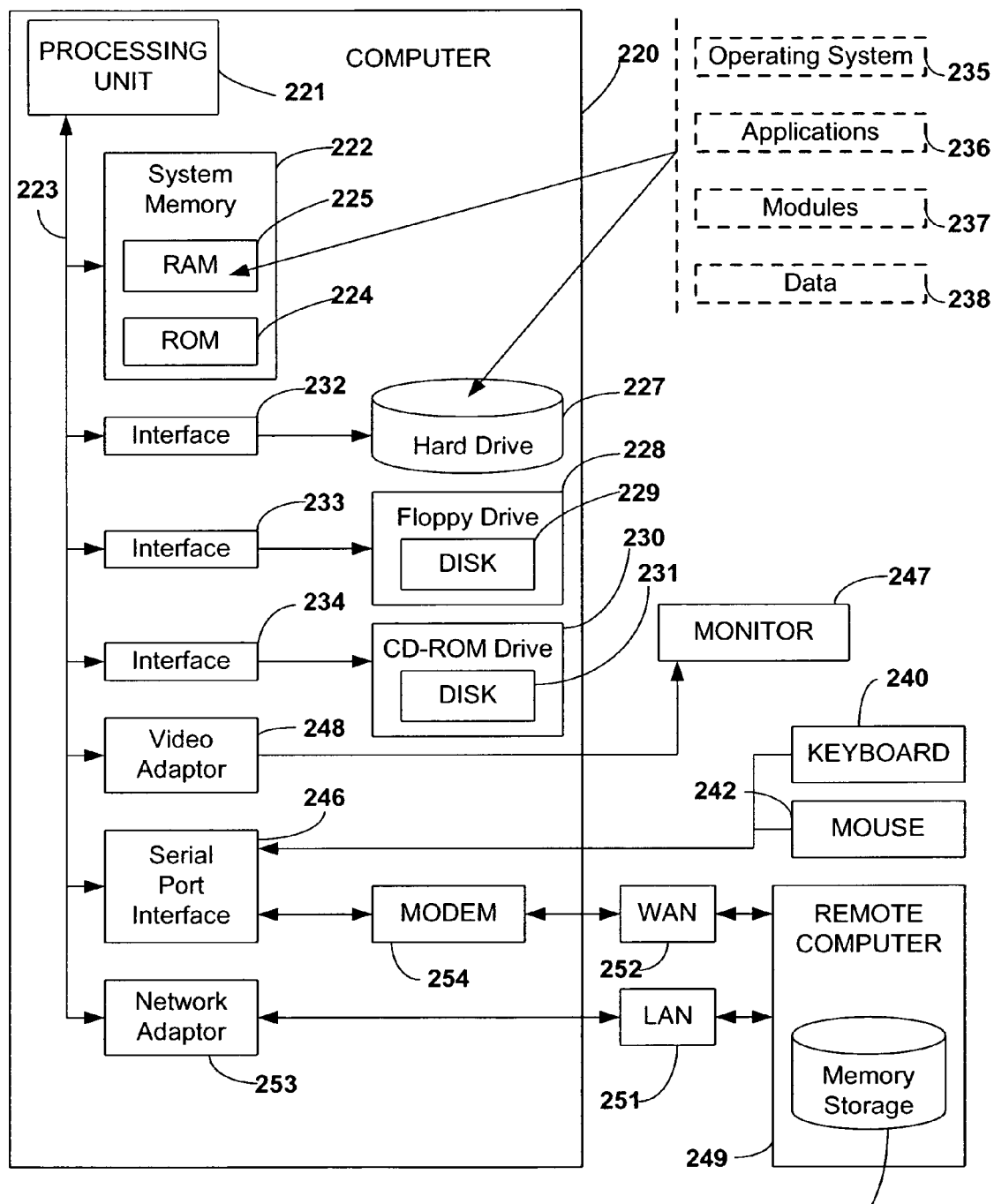
FIG. 10 is a schematic block diagram illustrating a suitable computing environment in accordance with an aspect of the present invention.

In order to provide a context for the various aspects of the invention, FIG. 10 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 10, an exemplary system for implementing the various aspects of the invention includes a computer 220, including a processing unit 221, a system memory 222, and a system bus 223 that couples various system components including the system memory to the processing unit 221. The processing unit 221 may be any of various commercially available processors. Dual microprocessors and other multi-processor architectures also can be used as the processing unit 221.

The system bus may be any of several types of bus structure including a memory bus or memory controller, a peripheral bus, and a local bus using any of a variety of commercially available bus architectures. The system memory may include read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading from or writing to a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. The operating system 235 in the illustrated computer may be substantially any commercially available operating system.

A user may enter commands and information into the computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote computer 249. The remote computer 249 may be a workstation, a server computer, a router, a peer device or other common network node, and typically includes many or all of the elements described relative to the computer 220, although only a memory storage device 250 is illustrated in FIG. 10. The logical connections depicted in FIG. 10 may include a local area network (LAN) 251 and a wide area network (WAN) 252. Such networking environments are commonplace in offices, enterprise-wide computer networks, Intranets and the Internet.

When employed in a LAN networking environment, the computer 220 may be connected to the local network 251 through a network interface or adapter 253. When utilized in a WAN networking environment, the computer 220 generally may include a modem 254, and/or is connected to a communications server on the LAN, and/or has other means for establishing communications over the wide area network 252, such as the Internet. The modem 254, which may be internal or external, may be connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An information retrieval system, comprising:
  a hierarchal analysis component that receives a query and processes probabilities associated with N categories that are collectively assigned a top-level classifier and individually assigned sublevel classifiers, each category having one or more topics, N being an integer, at least one of the one or more topics associated with a prior probability defined prior to receipt of the query, the prior probability indicating a likelihood that a particular topic is desired absent additional information; and
  an interactive component that provides feedback derived from the query, the probabilities associated with the N categories, and the prior probability associated with the at least one topic, the feedback utilized to determine at least one category of the N categories to facilitate retrieval of at least one of the one or more topics.

2. The system of claim 1, the top-level classifier and sublevel classifiers are provided by at least one of a Support Vector Machine, Naïve Bayes, Bayes Net, decision tree, similarity-based, vector-based and a Bayesian-based classification model.

3. The system of claim 2, further comprising an automatic classifier construction component that employs a learning model to build the classifiers.

4. The system of claim 3, the learning model is associated with a Support Vector Machine and employs Sequential Minimal Optimization (SMO) to train the classifiers.

5. The system of claim 3, further comprising a data structure that includes a mapping of I possible queries and one or more associated topics, I being an integer, to enable learning for the classifiers.

6. The system of claim 5, the data structure is updated via at least one of implicit and explicit user actions associated with a query to facilitate improved learning models.

7. The system of claim 5, the data structure is centrally located and retains monitored implicit and explicit user actions associated with queries from a plurality of users to facilitate improved learning models.

8. The system of claim 1, the top-level classifier is employed to drive the sublevel classifiers at run time to form a hierarchical classification structure.

9. The system of claim 8, the query and the top-level classifier are employed to determine the most likely of the N categories.

10. The system of claim 9, further comprising a context disambiguation component that utilizes the query and the top-level classifier to determine the feedback.

11. The system of claim 10, the context disambiguation component utilizes the query and the feedback to drive the sublevel classifiers in order to determine a desired topic.

12. The system of claim 10, the context disambiguation component further comprises a presentation component for interfacing to a user and an analytical component to facilitate feedback and decision-making related to the feedback.

13. The system of claim 12, the analytical component includes a cost-benefit analysis considering the cost of the dialog with the information value of the dialog.

14. The system of claim 12, the analytical component includes a decision analysis for determining the nature and quantity of a clarification dialog.

15. The system of claim 12, the analytical component includes a computation of the value of information associated with feedback gained during a clarification dialog to guide the nature and quantity of the clarification dialog.

16. The system of claim 12, the analytical component employs at least one of a rule-based policy and an expected utility policy that controls if and how dialog is invoked based on the distribution of probabilities assigned to topics at one or more layers of a classification scheme.

17. The system of claim 16, the analytical component analyzes probabilistic weights associated with each category and related subtopic for determining feedback and presentation to the user.

18. The system of claim 16, the analytical component analyzes probabilistic weights as a spread across each category and related subtopic for determining feedback and presentation to the user.

19. The system of claim 12, the presentation component includes a ranked display of most likely N categories.

20. The system of claim 19, at least one of the most likely N categories is selected to provide a ranked display of one or more topics.

21. The system of claim 1, information is retrieved as part of a help system.

22. The system of claim 1, information is retrieved from a network-based system.

23. The system of claim 1, the probabilities are determined via a hand-crafted analysis.

24. The system of claim 1, further comprising L levels of N categories, each category having one or more topics, wherein L and N are integers.

25. A computer-readable medium storing the computer-executable components of claim 1.

26. A method providing information retrieval from a database, comprising:
assigning prior probabilities to one or more topics prior to receipt of a query, the prior probabilities relate to a likelihood that a particular topic is desired by a user absent additional information;
determining probabilities associated with one or more categories that are associated with the one or more topics upon receipt of a query through employment of a top-level classifier assigned collectively to a plurality of categories that include the one or more categories and sublevel classifiers individually assigned to each category within the plurality of categories;
providing feedback that is derived from the query, the prior probabilities, and the determined probabilities associated with the one or more categories and the one or more topics; and
resolving at least one category of the one or more categories based upon the feedback to facilitate retrieval of at least one of the one or more associated topics.

27. The method of claim 26, the classifiers are at least one of a vector-based and a Bayesian-based model.

28. The method of claim 27, further comprising,
mapping I possible queries and associated topics within a data structure, I being an integer, to enable learning of the classifiers.

29. The method of claim 28, further comprising,
monitoring implicit and explicit user actions associated with a query to facilitate improved learning models.

30. The method of claim 28, further comprising,
monitoring a central data location for implicit and explicit user actions associated with queries from a plurality of users to facilitate improved learning models.

31. The method of claim 26, the top-level classifier is employed to drive the sublevel classifiers at run time to form a hierarchical classification structure.

32. The method of claim 31, the query and the top-level classifier are employed to determine the most likely of the one or more categories.

33. The method of claim 32, further comprising, utilizing the query and the top-level classifier to determine the feedback.

34. The method of claim 33, further comprising,
utilizing the query and the feedback to drive the sublevel classifiers in order to determine a desired topic.

35. The method of claim 26, further comprising,
utilizing at least one of a cost benefit analysis and a decision analysis for determining the feedback.

36. The method of claim 33, further comprising,
utilizing rule-based policies and expected-utility policies for establishing probabilistic thresholds associated with the feedback.

37. A system providing information retrieval, comprising:
means for assigning prior probabilities to one or more topics prior to receipt of a query, the prior probabilities relate to a likelihood that a particular topic is desired by a user absent additional information;
means for determining probabilities associated with N categories upon receipt of a query, each category having at least one of the one or more topics, N being an integer greater than one, the probabilities are determined through employment of a top-level classifier collectively assigned to the N categories and sublevel classifiers individually assigned to each of the N categories, the top-level classifier and sublevel classifiers are provided by at least one of a Support Vector Machine, Naive Bayes, Bayes Net decision tree, similarity-based, vector-based and a Bayesian-based classification model;
means for providing feedback that is derived from a query, the prior probabilities, and the probabilities associated with the N categories; and
means for determining at least one category of the N categories based upon the feedback to facilitate retrieval of at least one of the one or more topics.

38. A computer-readable medium comprising instructions for performing the method of claim 26.

* * * * *